(12) United States Patent
Ishii et al.

(10) Patent No.: US 7,406,008 B2
(45) Date of Patent: Jul. 29, 2008

(54) RECORDING MEDIUM AND SYSTEM FOR RECORDING AND REPRODUCING THE RECORDING MEDIUM USING CONTROL INFORMATION THAT REPRESENTS THE NUMBER OF SETS OF INFORMATION COMPOSING THE MULTIPLEXED AUDIO INFORMATION

(75) Inventors: Hidehiro Ishii, Saitama-ken (JP); Tadashi Noguchi, Saitama-ken (JP); Toshiro Tanikawa, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/493,188

(22) Filed: Jan. 28, 2000

(65) Prior Publication Data

US 2003/0123346 A1    Jul. 3, 2003

(30) Foreign Application Priority Data

Jan. 29, 1999  (JP)  .................................. 11-021206

(51) Int. Cl.
    G11B 7/007   (2006.01)
    G11B 20/10   (2006.01)
(52) U.S. Cl. ................. 369/47.16; 369/47.2; 369/59.27; 381/11; 386/99
(58) Field of Classification Search ............... 369/47.16, 369/47.2, 59.27, 53.37; 386/96, 97, 98, 99; 381/11
    See application file for complete search history.

(56) References Cited

U.S. PATENT DOCUMENTS

| | | | | |
|---|---|---|---|---|
| 4,445,151 A * | 4/1984 | Kinoshita et al. | ............. | 360/27 |
| 4,488,182 A * | 12/1984 | Takahashi et al. | ........... | 358/310 |
| 4,523,236 A * | 6/1985 | Hayashi et al. | ............. | 358/341 |
| 4,847,816 A * | 7/1989 | Kawahara et al. | ............. | 369/86 |
| 5,323,273 A * | 6/1994 | Azuma et al. | ............... | 360/19.1 |
| 5,430,738 A * | 7/1995 | Tsuda | ........................ | 371/37.1 |
| 5,668,339 A * | 9/1997 | Shin | ............................ | 84/634 |
| 5,745,643 A * | 4/1998 | Mishina | ...................... | 386/106 |
| 5,852,800 A * | 12/1998 | Modeste et al. | ............. | 704/211 |
| 5,926,448 A * | 7/1999 | Yokota et al. | .................. | 369/47 |
| 5,956,460 A * | 9/1999 | Yamagata et al. | ............. | 386/96 |
| 6,097,558 A * | 8/2000 | Oguro | .......................... | 360/22 |
| 6,130,988 A * | 10/2000 | Jeong | .......................... | 386/125 |
| 6,167,192 A * | 12/2000 | Heo | ............................ | 386/124 |
| 6,195,437 B1 * | 2/2001 | Markow et al. | ............... | 381/93 |
| 6,208,800 B1 * | 3/2001 | Katsuyama et al. | ........... | 386/83 |
| 6,243,220 B1 * | 6/2001 | Aoki et al. | ..................... | 360/18 |
| 6,252,965 B1 * | 6/2001 | Beard | .......................... | 381/23 |
| 6,253,021 B1 * | 6/2001 | Yagi et al. | .................... | 386/105 |
| 6,353,580 B1 * | 3/2002 | Mons | .......................... | 369/32 |
| 6,477,313 B1 * | 11/2002 | Itoi | ............................. | 386/52 |
| 6,553,180 B1 * | 4/2003 | Kikuchi et al. | ................. | 386/95 |

\* cited by examiner

*Primary Examiner*—Gautam R Patel
(74) *Attorney, Agent, or Firm*—Steve A. Wong; Caroline T. Do

(57) ABSTRACT

A recording medium has a first recording area on which multiplexed audio informations are recorded as sets of one or more information units, a second recording area on which control information for controlling recording of the multiplexed audio informations are recorded. The control informations include first information representing the number of sets of information composing the multiplexed audio informations, and second information instructing to record the multiplexed audio informations as a stream.

60 Claims, 8 Drawing Sheets

FIG.7 a

|  | MIXED MODE FLAG |
|---|---|
| MIXED RECORDING MODE | "1" |
| SINGLE RECORDING MODE | "0" |

FIG.7 b

|  | CHANNEL NUMBER |
|---|---|
| MULTIPLEXED AUDIO DATA | 1+1 CHANNEL DATA (011) |
| MULTI-CHANNEL AUDIO DATA | 2/0 CHANNEL DATA (000) |
| MONAURAL AUDIO DATA | 1/0 CHANNEL DATA (001) |

FIG.7 c

|  | CHANNEL NUMBER | MIXED MODE FLAG |
|---|---|---|
| MIXED MULTIPLEXED AUDIO DATA AND MULTI-CHANNEL AUDIO DATA | 1+1 | FLG="1" |
|  | 2/0 | FLG="1" |
| MULTIPLEXED AUDIO DATA | 1+1 | FLG="0" |
| MULTI-CHANNEL AUDIO DATA | 2/0 | FLG="0" |
| MONAURAL AUDIO DATA | 1/0 | FLG="0" |

RECORDING MEDIUM AND SYSTEM FOR RECORDING AND REPRODUCING THE RECORDING MEDIUM USING CONTROL INFORMATION THAT REPRESENTS THE NUMBER OF SETS OF INFORMATION COMPOSING THE MULTIPLEXED AUDIO INFORMATION

BACKGROUND OF THE INVENTION

The present invention relates to a recording medium and a system for recording and reproducing the recording medium, and more particularly to a recording medium having a logical data structure for recording and reproducing information, the recording modes of which varies.

There has been known the DVD-Video, which is an optical read-only disc capable of storing high-quality video information and audio information. The DVD-Video records information based on a specific logical data structure so as to be applied in an extensive field and to have various functions enabling various interactive reproduction thereof.

In accordance with the logical data structure, which is disclosed in known documents, the DVD-Video comprises a lead-in area at the inner end portion of the disc, lead-out area at the outer end portion, and a data recording area between the lead-in and lead-out areas wherein a plurality of data files are stored.

The data which is recorded in the data recording area can be roughly divided into presentation data to be reproduced and navigation data for controlling the reproduction. The navigation data includes attribute of the presentation data and control data necessary for the reproduction. There are five navigation data, which are video manager information (VMGI), video title set information (VTSI), program chain information (PGCI), presentation control information (PCI), and data search information (DSI).

The presentation data comprises video data, audio data and subpicture data which are integrated together with a part of the navigation data in accordance with the MPEG 2 standard (ISO 13818-1).

The video data has one stream of data compressed in accordance with the MPEG 2 video format (ISO 13818-2). The audio data take up a maximum of eight streams and comply with in one of the linear PCM, AC-3 and MPEG audio standards.

The subpicture data are data compressed in accordance with the run-length coding for enabling menus, and credits and words in the case of movies and karaoke system to be displayed over the main image, and take up a maximum of 32 streams.

These video data, audio data, and subpicture data are aggregated into sets in pack unit so as to form a bit stream multiplexed in plurality of pack units, thereby forming the presentation data.

The presentation control information (PCI) and data search information (DSI) are added to each of the video data, audio data and subpicture data to form a video object unit (VOBU).

The presentation control information (PCI) is provided for determining the reproduction information in accordance with the condition of the presentation data. The data search information (DSI) relates to fast forward and rearward reproductions and continual reproduction.

A plurality of video object units (VOBU) form a cell (CELL), and a plurality of cells (CELL) form a video object (VOB), and a plurality of video objects (VOB) form a video object set (VOBS).

The video title set information (VTSI) and the program chain information (PGCI) are added to one or more video object set (VOBS) to form a video title set (VTS). A plurality of video title sets (VTS) are recorded sequentially after control data called video manager (VMG) having video manager information (VMGI).

The video title set information has attribute information of the video object set (VOBS) in the video title set (VTS). The program chain information (PGCI) has information on reproducing order of the presentation data in the form of information on order of the cells (CELL). The video manager information (VMGI) has information on the directory of the video title set (VTS).

The reproduction of the presentation data is controlled in accordance with the information of the navigation data so as to enable the interactive reproduction.

The DVD-RW (rewritable) has also become to attract attention in addition to the DVD-Video. The DVD-RW belongs to the same so-called DVD family including the DVD-Video, and has the physical compatibility therewith. Since the DVD-RW is capable of recording, reproducing, erasing and rewriting information, it is a recording medium extremely suitable to the user for producing or authoring a desirable multimedia title.

However, if the logical data structure for the DVD-Video is simply adapted to DVD-R and DVD-RW, since various types of information are now recorded, there occur problems.

In the DVD-Video, there is provided a stereophonic recording mode called 2/0 mode wherein 2-channel audio data are recorded as one audio stream, and a monaural recording mode called 1/0 mode wherein a monaural audio data are recorded as one audio stream.

However, when recording a movie which is bilingually broadcast, the bilingual speech and stereophonic sound are frequently alternately changed. Namely, audio information to be recorded includes individual information in multiple languages, each having the same time base, hereinafter referred to as multiplexed information, and multi-channel information such as the stereophonic audio information, hereinafter referred to as multi-channel information. In order to record a television program having such audio information, each time the type of the audio information changes, the audio stream is changed between the stereophonic recording mode to monaural recording mode, so that the video object (VOB) must be freshly set.

More particularly, at a bilingual broadcast, the monaural recording mode is selected so that a main sound and a sub sound are each recorded in a separate stream, thereby using two streams. At a stereophonic broadcast, the stereophonic recording mode is selected so that one stream is used. Every time the recording mode changes, a new video object is required. The same procedure is necessary when the bilingual speech and the monaural sound are alternately changed.

When the information is thus recorded, changing over the audio stream, the audio stream must also be changed when reproducing the information. When changing the stream at the reproduction, noises may generate, or a silent period may occur, thereby causing deterioration in sound quality.

In addition, if the reproduced digital audio data is supplied to a conventional digitally input audio-visual device, each time the audio stream is changed, the reproduction mode must be changed between the stereophonic reproduction mode and monaural reproduction mode.

SUMMARY OF THE INVENTION

An object of the present invention is to provide a recording medium which may efficiently record recording information under a plurality of recording modes.

According to the present invention, there is provided a recording medium comprising, a first recording area on which multiplexed audio informations are recorded as sets of one or more information units, a second recording area on which control information for controlling recording of the multiplexed audio informations are recorded, wherein the control informations include first information representing the number of sets of information composing the multiplexed audio informations, and second information instructing to record the multiplexed audio informations as a stream.

The first information further represents the number of multi-channel audio informations, and the second information instructs to record the multiplexed audio informations and the multi-channel audio informations as a stream.

The present invention further provides a system for recording information on a medium having a first recording area on which multiplexed audio informations are recorded as sets of one or more information units, and a second recording area on which control information for controlling recording of the multiplexed audio informations are recorded, the system comprising, recording means for recording first information representing the number of sets of information composing the multiplexed audio informations, and second information instructing to record the multiplexed audio informations as a stream in the second recording area.

The present invention further provides a system for reproducing informations recorded on a medium having a first recording area on which multiplexed audio informations are recorded as sets of one or more information units, and a second recording area on which control information for controlling recording of the multiplexed audio informations are recorded, the control informations including first information representing the number of sets of information composing the multiplexed audio informations, and second information instructing to record the multiplexed audio informations as a stream, wherein the system has control means for controlling the reproduction of the informations recorded on the medium based on the first information and second information.

These and other objects and features of the present invention will become more apparent from the following detailed description with reference to the accompanying drawings.

BRIEF DESCRIPTION OF DRAWINGS

FIGS. 7a, 7b and 7c are tables for explaining application modes and conditions of mixed mode flag in accordance with various recording modes.

DETAILED DESCRIPTION OF THE PREFERRED EMBODIMENT

The expressions used hereinafter are described. Multiplexed audio information refers to multiple-language audio information such as the bilingual speech, and in a more physical term, audio information which consists of two or more individual sets of information having the same time base. Multi-channel audio information refers to audio information in a plurality of channels such as stereophonic audio information comprising information for right and left channels.

In the present embodiment, the recording medium and the recording and reproducing system for multiplexed audio information comprising a native language and a foreign language, and two-channel audio information are described as an example.

Figure 1:
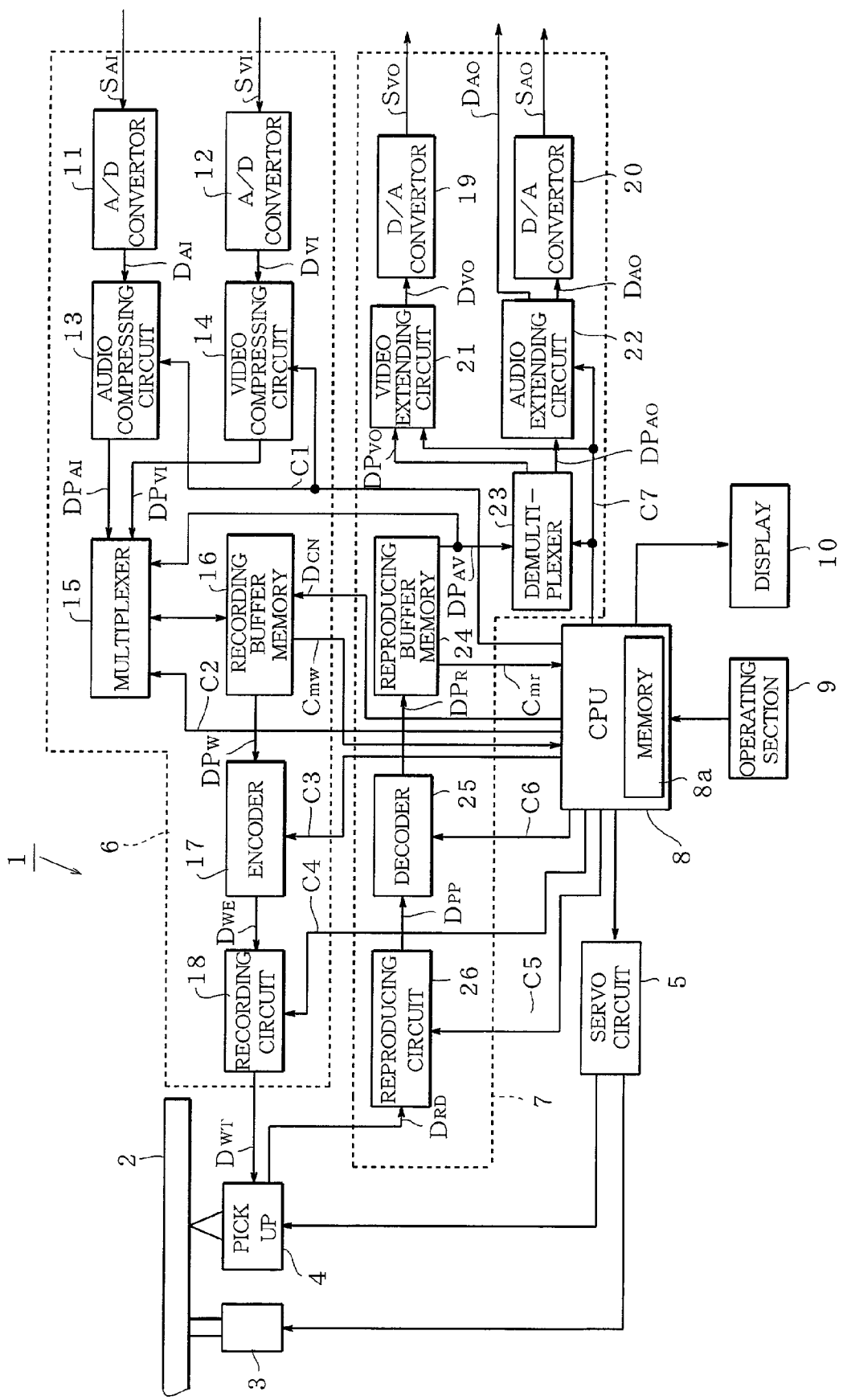
FIG. 1 is a block diagram showing a recording and reproducing system of the present invention.

Referring to FIG. 1, a recording and reproducing system 1 of the present invention comprises a spindle motor 3 for rotating a recording medium (DVD-RW) 2, pickup 4 for recording and reproducing information on and from the DVD-RW 2, servo circuit 5 for controlling the spindle motor 3 and pickup 4, recording system 6 for producing data to be recorded on the DVD-RW 2, reproducing system 7 for reproducing data recorded on the DVD-RW 2, central control circuit 8 for controlling the system 1, operating section 9 for instructing the central control system 8 to control the system by a user, and display 10.

The recording system 6 comprises an A/D converters 11 and 12, audio compressing circuit 13, video compressing circuit 14, multiplexer 15, recording buffer memory 16, encoder 17 and recording circuit 18.

The A/D converter 11 converts an input audio analog signal $S_{AI}$ to a digital audio data $D_{AI}$.

When the audio signal $S_{AI}$ is a stereophonic audio signal, the signal is converted to the digital data in accordance with each channel. When the audio signal $S_{AI}$ is a multiplexed signal having a main sound and a sub-sound, the main sound signal and the sub-sound signal are each converted to digital data.

The audio compressing circuit 13 compresses the audio data $D_{AI}$ designated by a control signal C1 applied from the central control circuit 8 to produce a compressed audio data $DP_{AI}$ which is fed to the multiplexer 15. In accordance with the present embodiment, the data are compressed in accordance with one of the linear PCM standard, AC-3 standard, and the MPEG audio standard, which is selected by operating the operating section 9.

When the stereophonic audio data $D_{AI}$ is applied, the audio compressing circuit 13 compresses the data in accordance with each channel, and when the multiplexed audio data $D_{AI}$ is applied, the data is compressed in accordance with each of the main sound and sub-sound.

The A/D converter 12 converts an input analog video signal $S_{VI}$ to a digital video data $D_{VI}$. The video compressing circuit 14 compresses the video data $D_{VI}$ to produce a compressed video data $DP_{VI}$ which is fed to the multiplexer 15. The data are compressed at the video compressing circuit 14 in accordance with the MPEG 2 video audio standard (ISO 13818-2).

The multiplexer 15 multiplexes the compressed audio data $DP_{AI}$ with the compressed video data $DP_{VI}$ at a predetermined timing designated by a control signal C2 from the central control circuit 8 to produce a compressed data $DP_W$ which is time-shared.

The recording buffer memory 16 temporarily stores the compressed audio data $DP_{AI}$ and the compressed video data $DP_{VI}$ to produce the compressed data $DP_W$, cooperating with the mutiplexer 15. The compressed data $DP_W$ is fed to the encoder 17. Further, the recording buffer memory 16 applies a data quantity signal Cmw representing the length of the data to the central control circuit 8. A data quantity dependent on the data quantity signal Cmw is displayed on the display 10.

The encoder 17 encodes the compressed data $DP_W$ in accordance with a control signal C3 from the central control circuit 8 to produce an encoded data $D_{WE}$ which is fed to the recording circuit 18.

Furthermore, the encoder 17 generates navigation data necessary for controlling the reproduction of information in accordance with the control signal C3.

More particularly, when the audio signal $S_{AI}$ is a multiplexed audio signal, a multiplex recording mode is selected so that navigation data indicating that the compressed audio data $DP_{AI}$ of the main sound and sub-sound are recorded as one stream is generated. The navigation data are recorded under channel number CHn in an audio stream attribute table (VOB_AST_ATRT) shown in FIG. 4 and later described. More particularly, data represented by a predetermined code "011" is recorded. The code "011" is hereinafter called 1+1 channel data.

On the other hand, when the audio signal $S_{AI}$ is a multichannel audio signal, a multi-channel recording mode is selected so that navigation data indicating that the compressed audio data $DP_{AI}$ of the two channels are recorded as one stream is generated. The navigation data are recorded under the channel number CHn in the audio stream attribute table (VOB_AST_ATRT) as a predetermined code "000". The code "000" is hereafter called 2/0 channel data.

When the audio signal $S_{AI}$ is a monaural audio signal, a monaural recording mode is selected so that navigation data indicating that the compressed monaural audio data $DP_{AI}$ are recorded as one stream is generated. The navigation data are recorded under the channel number CHn in the audio stream attribute table (VOB_AST_ATRT) as a predetermined code "001". The code "001" is hereafter called 1/0 channel data.

One audio stream attribute table (VOB_AST_ATRT) is provided.

If the audio signal $S_{AI}$ is stereophonic audio signal or the multiplexed audio signal, the user may select the monaural recording mode. In such a case, one of the right channel data and the left channel data are recorded in one stream, or one of the main sound data and the sub-sound data is recorded in one stream. In addition, each steam is controlled in accordance with each channel data.

Moreover, the audio data under one title which is to be recorded in the DVD-RW 2 comprises stereophonic, multiplexed and monaural data intermingled with each other, a mixed mode flag FLG is set to a bit data "1" under an application mode of the audio stream attribute table (VOB_AST_ATRT). If data are not intermingled, the mixed mode flag FLG is set to "0".

The recording circuit 18 power-amplifies the encoded data $D_{WE}$ in accordance with a control signal C4 from the central control circuit 8 to produce a recording data $D_{WT}$ which is applied to the pickup 4.

A semiconductor laser provided in the pickup 4 is driven by the recording data $D_{WT}$ to emit a laser beam, so that the recording data $D_{WT}$ is recorded on the DVD-RW 2.

The reproducing system 7 comprises a D/A converter 19 and 20, video extending circuit 21, audio extending circuit 22, demultiplexer 23, reproducing buffer memory 24, decoder 25 and reproducing circuit 26.

The reproducing circuit 26 shapes the waveform of a detected signal $D_{RD}$ read out from the DVD-RW 2 by the pickup in accordance with a control signal C5 from the central control circuit 8 to produce a binary reproducing data $D_{PP}$ which is fed to decoder 25.

The decoder 25 decodes the reproducing data $D_{PP}$ based on a predetermined decode system corresponding to the encode system of the encoder 17 in accordance with a control signal C6 from the central control circuit 8 to produce a decoded data $DP_R$ which is applied to the reproducing buffer memory 24.

The buffer memory 24 temporarily stores the decoded data $DP_R$ and sends a navigation data Cmr included in the decoded data $DP_R$ to the central control circuit 8 which in trun generates the control signal C7 necessary for reproduction. Furthermore, the reproducing memory 24 arranges the temporarily storing decoded data $DP_R$ into a decoded data $DP_{AV}$ in synchronism with a predetermined timing. The decoded data $DP_{AV}$ is fed to the demultiplexer 23.

The demultiplexer 23 demultiplexes a compressed video data $DP_{VO}$ and a compressed audio data $DP_{AO}$ which are multiplexed in the decoded data $DP_{AV}$ in accordance with the control signal C7 from the central control circuit 8. The compressed video data $DP_{VO}$ supplied to the video extending circuit 21, and the compressed audio data $DP_{AO}$ is supplied to the audio extending circuit 22.

The video extending circuit 21 extends the compressed video data $DP_{VO}$ to produce an extended video data $D_{VO}$. The audio extending circuit 22 extends the compressed audio data $DP_{AO}$ to produce an extended audio data $D_{AO}$.

Figure 2:
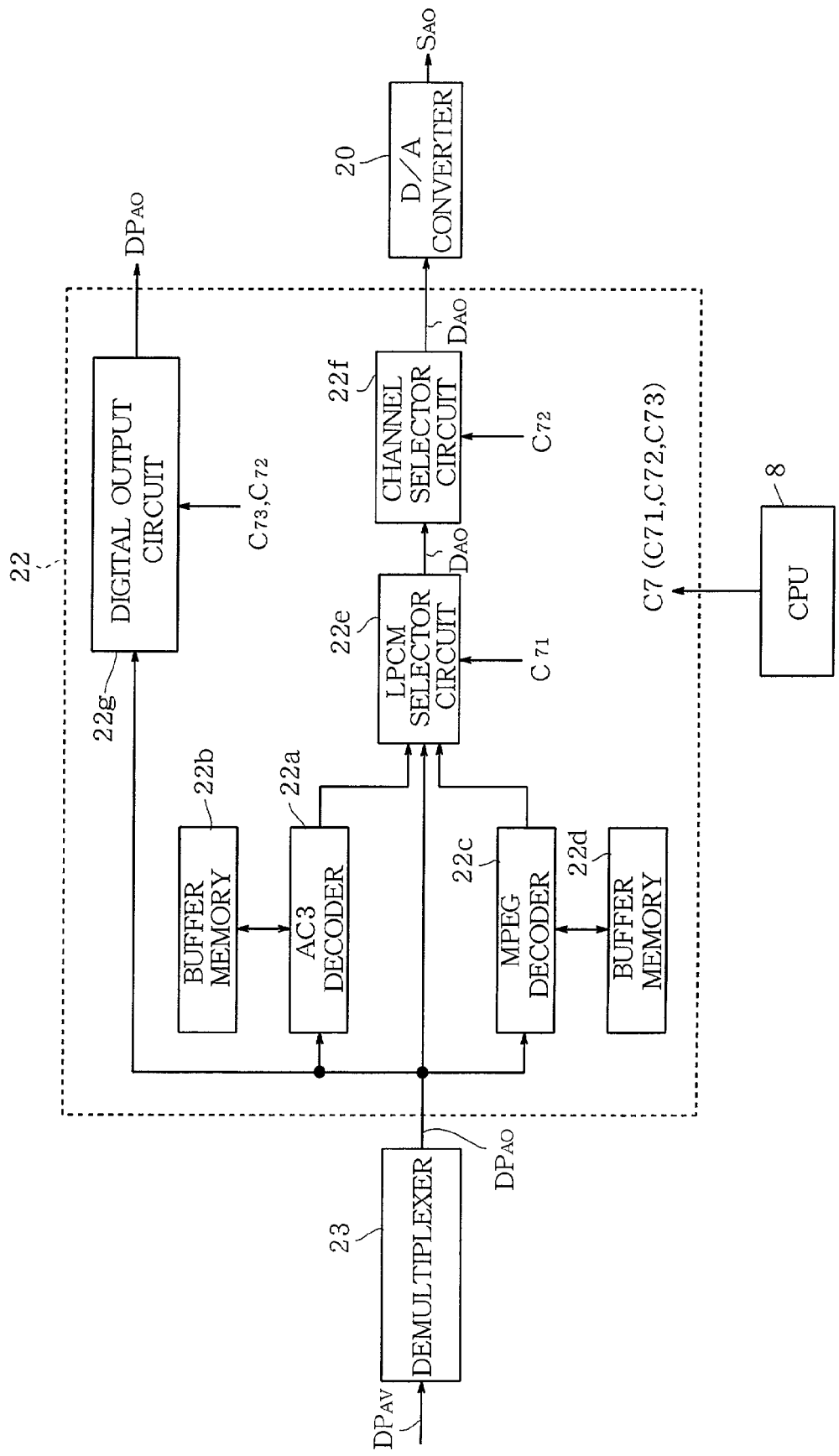
FIG. 2 is a block diagram of an audio extending circuit provided in the system of FIG. 1.

Referring to FIG. 2, the audio extending circuit 22 comprises an AC-3 decoder 22a, MPEG decoder 22c, LPCM selector circuit 22e and a digital output circuit 22g, to each of which is applied the compressed audio data $DP_{AO}$ from the demultiplexer 23. The AC-3 decoder 22a extends the compressed AC-3 standard audio data $DP_{AO}$ to form the extended audio data $D_{AO}$ which is in compliance with the linear PCM standard. The audio data is temporarily held in a buffer memory 22b and further applied to the selector circuit 22e at a predetermined timing.

The MPEG decoder 22c extends the compressed MPEG standard audio data $DP_{AO}$ to form the extended audio data $D_{AO}$ which is in compliance with the linear PCM standard. The audio data is temporarily held in a buffer memory 22d and further applied to the LPCM selector circuit 22e at a predetermined timing.

The LPCM selector circuit 22e selects a connection between the demultiplexer 23 and a channel selector circuit 22f in accordance with a select control signal $C_{71}$ which is one of the control signals C7 fed from the central control circuit 8. For example, when the compressed data $DP_{AO}$ is the linear PCM standard data, the data is directly fed from the demultiplexer 23 to the channel selector circuit 22f. On the other hand, the compressed AC-3 standard data $DP_{AO}$ is fed to the AC-3 decoder 22a and extended to form the audio data $D_{AO}$ and fed to the channel selector circuit 22f through the LPCM selector circuit 22e. The compressed MPEG standard data $DP_{AO}$ is extended at the MPEG decoder 22c to form the audio data $D_{AO}$ and fed to the channel selector circuit 22f through the LPCM selector circuit 22e.

The channel selector circuit 22f is operated in accordance with a channel select control signal $C_{72}$ which is one of the control signals C7 applied from the central control circuit 8. Namely, when the audio data $D_{AO}$ are multiplexed audio data, and the channel is changed over in accordance with the control signal C7 so as to reproduce the main sound, the data of the main sound included in the data $D_{AO}$ are fed to the D/A converter 20. If the channel is changed over so as to reproduce the sub-sound, the data of the sub-sound are generated. If both the main sound and the sub-sound are to be reproduced, the audio data $D_{AO}$ of the main and sub-sounds are fed to the D/A converter 20.

The digital output circuit 22g is provided so that the compressed data $DP_{AO}$ may be applied to digitally input audio-visual device. When the user operates the operating section 9 to instruct the reproduction of information in accordance with one of the standards AC-3, MPEG audio, and linear PCM, the compressed audio data $DP_{AO}$ are fed from the demultiplexer 23 to the digital output circuit 22g which automatically selects the compressed audio data $DP_{AO}$ of the desired compression standard in accordance with output select control signal $C_{73}$ and channel select control signal $C_{72}$ of the control signal C7 fed from the central control circuit 8.

The audio data $D_{AO}$ from the channel selector circuit 22f are also fed to the digital output circuit 22g. Thus the audio-visual device may reproduce only the main sound, or the left channel in the 1+1 channel data of AC-3 standard in accordance with the instruction of the user.

Referring back to FIG. 1, the D/A converter 19 converts the video data $D_{VO}$ to produce an analog video signal $S_{VO}$. The D/A converter 20 converts the audio data $D_{AO}$ to produce an analog audio signal $S_{AO}$.

The central control circuit 8 has a memory 8a storing a system program and others and a CPU for controlling the operation of the whole system.

Namely, the central control circuit 8 controls the operation of the servo circuit 5, the recording system 6, and the reproducing system 7. At the recording, the central control circuit 8 further controls the operation for generating data on channel number CHn and mixed mode flag FLG and others which are to be written in the audio stream attribute table (VOB_AST_ATRT). At the reproduction, the central control circuit 8 controls the reproduction based on the data on CHn and mixed mode flag FLG and others. Moreover, instructions from the user is fed through the operating section 9 so that the central control circuit 8 displays present operation content of the reproducing device 1, various informations relative to recording information and reproduction information, information on navigation data related to audio data and video data which are being recorded or reproduced, and menus indicating a manipulation method and others on the display 10.

Hereinafter described with reference to FIGS. 3 to 6 is a logical data structure of the DVD-RW 2. The DVD-RW 2 has a hardware compatibility with the DVD-Video and has a common logical data structure to the DVD-Video. Here the characteristic of the DVD-RW will be described.

Figure 3:
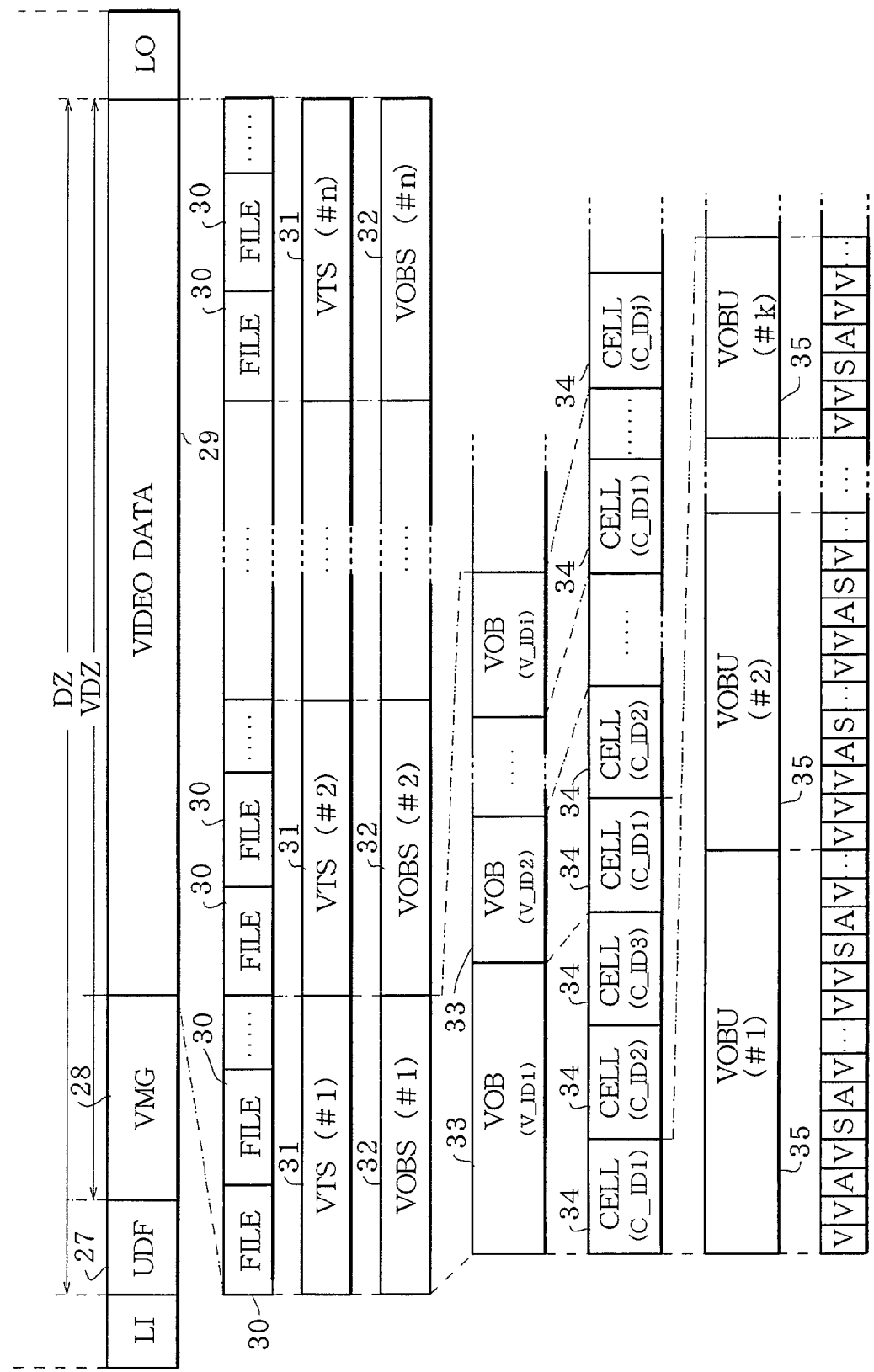
FIG. 3 is an illustration showing a structure of a logical data of a recording medium of the present invention.

FIG. 3 shows the whole logical data structure. The DVD-RW 2 comprises a lead-in area LI at the inner end portion of the disc, data recording zone DZ and lead-out area LO.

The data recording zone DZ comprises a UDF recording area 27 wherein a micro-Universal Disc Format (UDF) as a logical format representing the relationship between the physical address and the logical address is recorded, and a video data recording zone VDZ.

The video data recording zone VDZ comprises a video manager recording area 28 wherein a control data having a video manager information (VMGI) is recorded, and a video data recording area 29 wherein video data, audio data, and others are recorded. The control data is called a video manager (VMG).

In the video data recording zone VDZ, data are recorded as a plurality of files 30 which are divided into a plurality of sets each of which comprises a plurality of files.

As an uppermost order recording unit, there is provided video title sets (VTS: Video Title Set) 31 from #1 to #n wherein a video title can be recorded. Each video title set is combined with a video object set (VOBS: Video Object Set) 32.

Each video object set 32 comprises one or more video object (VOB) 33 and is identified by an ID number (V_ID1~V_IDi).

Each video object 33 comprises one or more cell (CELL) 34, and each cell 34 comprises one or more video object unit (VOBU) 35. Each cell 34 is identified by an ID number (C_ID1~C_IDj).

Each video object (VOBU) 35 comprises a set of one or more video pack V, audio pack A and subpicture pack S.

Thus, the presentation data comprising the video pack V, audio pack A and subpicture pack S is hierarchized by the video object unit 35, cell 34, video object 33, video object set 32, and video title set 31.

Namely, the presentation data comprising the video pack V, audio pack A and the subpicture pack S are assigned to video object unit (VOBU) 35, cell (CELL) 34, video object (VOB) 33, video object set (VOBS) 32 and video title set (VTS) 31 so as to be managed. When the playback mode, the presentation data is reproduced in accordance with the step described the program chain information (PGCI).

Figure 4:
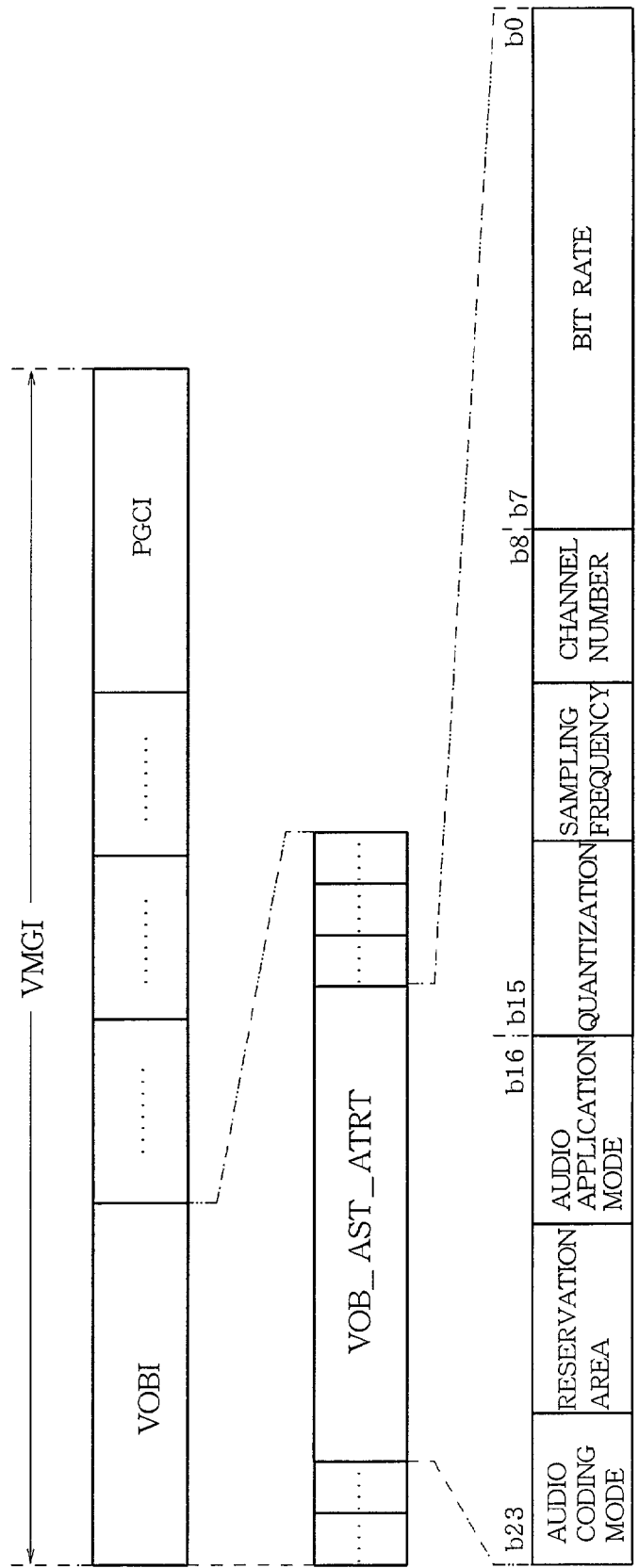
FIG. 4 shows video management information.

Referring to FIG. 4, in the video manager recording area 28, video manager information (VMGI) including at least the program chain information (PGCI) and video object information (VOBI) is recorded.

The video object information is information relative to the attribute of each video object, and provided with the attribute table indicating the video pack V, audio pack A and subpicture pack S which are included in the video object.

The program chain information (PGCI) is provided with information indicating reproducing order of the presentation data.

The video manager information (VMGI) is a management data for recording and reproducing the video title sets VTS (#1)~VTS(#n). In the program chain information (PGCI), the information regarding the reproducing order of the presentation data is recorded as the information regarding the order of the cells (CELL). The video object information (VOBI) is a table for recording the attribute of the presentation data for each unit of video object (VOB).

One of the items in the video object information (VOBI) is the audio stream attribute table (VOB_AST_ATRT) for writing the attribute of the audio pack A included in the video object (VOB).

The audio stream attribute table (VOB_AST_ATRT) comprises three bytes and stores information on audio coding mode, audio application mode, quantization Qb, sampling frequency fs, number CHn of audio channel, and bit rate.

The audio coding mode shows a binary code indicating which of the MPEG 2 audio, AC-3 and linear PCM compressing standards is used for the audio pack A.

The mixed mode flag FLG is recorded in the application mode. As shown in FIG. 7a, when the recording information of one title to be recorded on the DVD-RW 2 has multiplexed audio data, multi-channel audio data, monaural audio data, intermingled with one another, the flag FLG is set to "1". If only one kind of data is used, the flag is set to "0".

In the channel number CHn, the 1+1 channel data indicating that the main and sub-sounds are recorded as one stream are recorded in the case of multiplexed audio data. In the case of multi-channel audio data, the 2/0 channel data are recorded to indicate that the data for two channels are recorded as one stream. In the case of monaural audio data, the 1/0 channel data are recorded to indicate that the data are recorded as one stream.

Thus, in the audio stream attribute table (VOB_AST_ATRT), the quality and the recording condition of the audio stream recorded on the DVD-RW 2 are recorded. The central control circuit 8 generates control signals C5 to C7 necessary for reproduction in accordance with the information stored in the audio stream attribute table.

Figure 5:
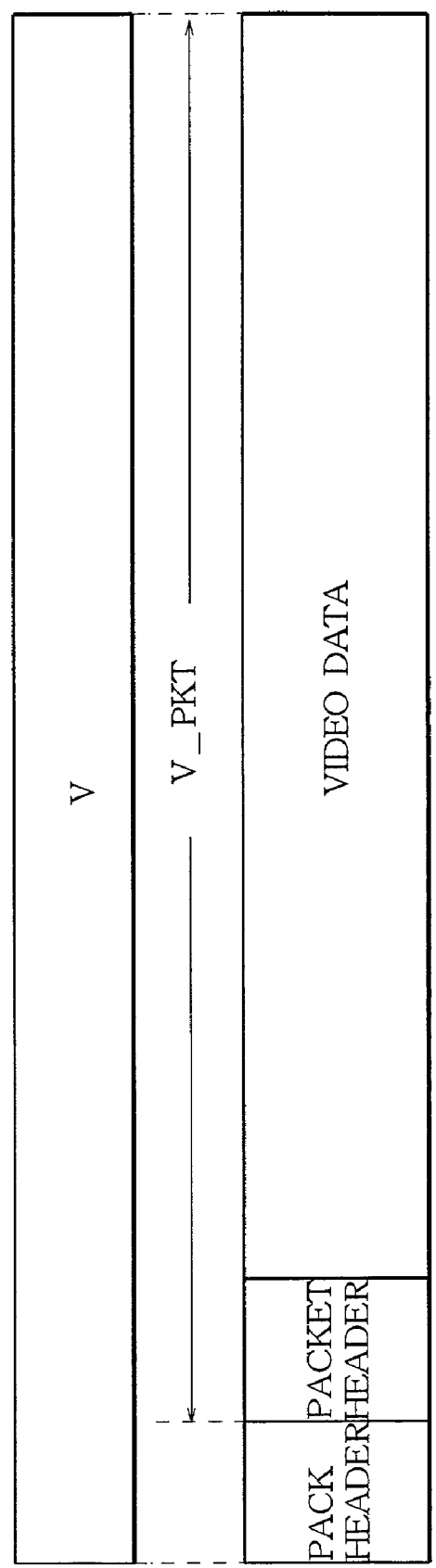
FIG. 5 shows a video pack.
Figure 6:
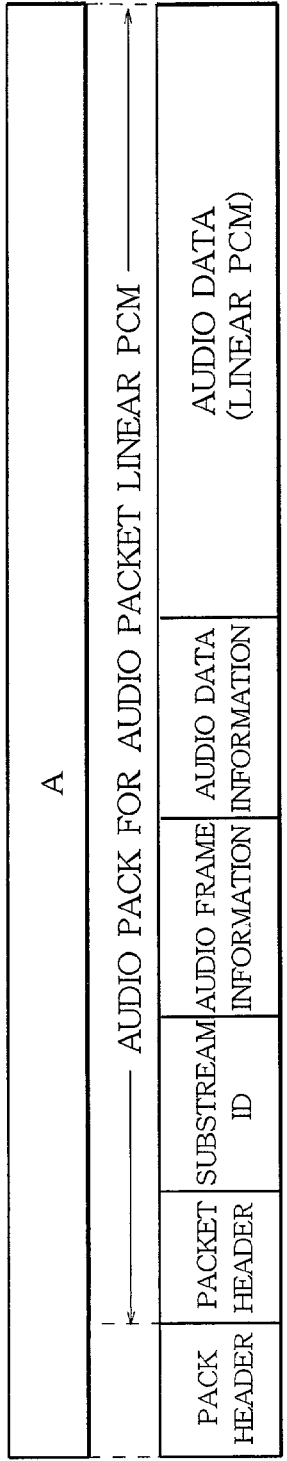
FIGS. 6a to 6c show audio packs.
Figure 6:
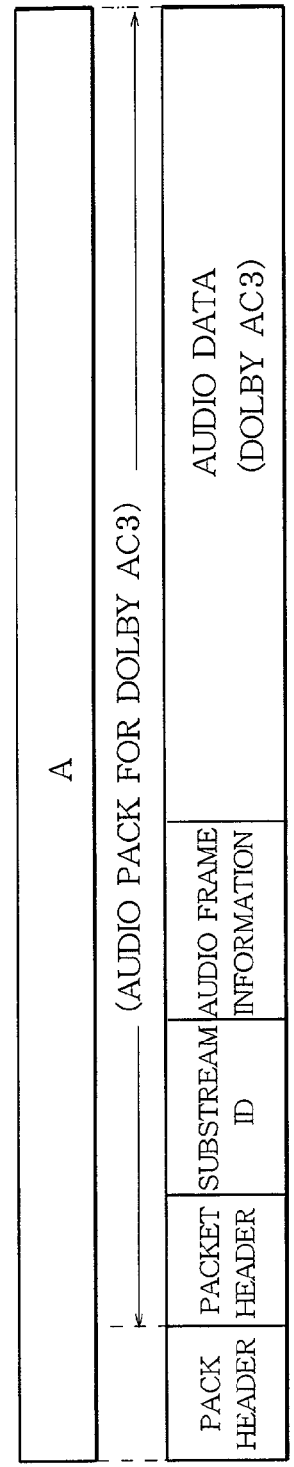
Figure 6:
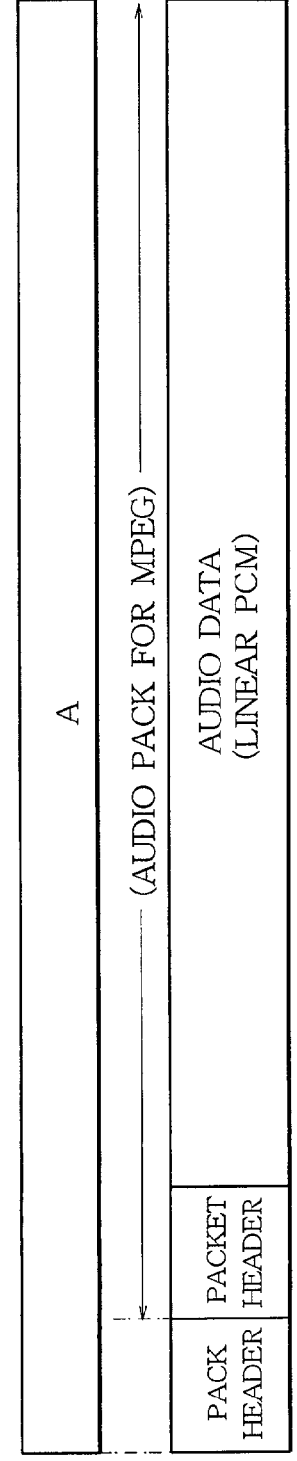

Referring to FIG. 5, a pack header, packet header and video data are recorded in the video pack V. In the audio pack A, audio data are variously recorded in accordance with the difference of the compression system as shown in FIGS. 6*a*, 6*b* and 6*c*. Moreover, at least the number of channels of the audio data is recorded as in the DVD-Video as the attribute of the audio data. Namely, in the case of the stereophonic audio data, channel number data indicating two channels are recorded. In the case of the multiplexed audio data, the channel number data indicating two channels for the main sound and sub-sound is recorded.

There is described the operation for recording and reproducing bilingual broadcast program such as a foreign movie wherein the audio signal is frequently changed from multiplexed audio signal to stereophonic audio signal and again to multiplexed audio signal.

As shown in FIG. 1, when the recording of the program is started, audio signal $S_{AI}$ and video signal $S_{VI}$ are processed at the A/D converters 11 and 12, audio compressing circuits 13 and 14 to form the compressed audio data $D_{AI}$ and compressed video data $D_{VI}$, respectively. The compressed data are applied to the multiplexer 15 so as to be time-shared and multiplexed. The multiplexed data are encoded at the encoder 17 and recorded on the DVD-RW 2 by the recording circuit 18 and the pickup 4 together with the navigation data regarding the attributes thereof.

During the movie program, the multiplexed audio signal $S_{AI}$ including the main sound and sub-sound is input so that the multiplex recording mode is selected. When commercial message is broadcast, the stereophonic recording mode is selected.

However, only one audio stream attribute table (VOB_AST_ATRT) is needed.

Namely, as the audio coding mode shown in FIG. 4, the data on the data compressing system selected by the user are recorded. As the application mode, the mixed mode flag indicating whether the multiplexed audio data and the multichannel audio data are intermingled in the finally recorded program. In addition, if the first recorded audio data are the multiplexed audio data, 1+1 channel data are recorded as the channel number CHn. If the stereophonic data are recorded first, 2/0 channel data are recorded. The channel number CHn may be recorded based on the first recorded audio data, or the recording timing may be set as appropriate.

As the quantization and sampling frequency, the data on quantization and the sampling frequency set at the A/D converter 11 are stored.

The program chain information (PGCI) includes the order in which the video object (VOB) is to be reproduced, and the control data for reproducing an audio stream.

Thus, in the present embodiment, the DVD-RW 2 has a logical data structure in which the intermingled multiplexed audio signals and stereophonic audio signals are recorded in one audio stream. The recording and reproducing system 1 records the multiplexed signals, stereophonic signals and the monaural signals in one stream.

In the case where the multiplexed audio signal is recorded using two streams in accordance with the standard set for the DVD-Video, the video object (VOB), the number of which is limited, is largely consumed. On the other hand, in the present invention, the multiplexed audio signal can be recorded in one stream, so that the consumption of the video object can be restrained.

Accordingly, the recording quantity of the management data such as the navigation data can also be reduced so that the recording capacity of the DVD-RW is virtually increased, thereby enabling efficient recording.

When the multiplexed recording mode and the stereophonic recording mode are intermingled, the mixed mode flag FLG recorded in the audio stream attribute table (VOB_AST_ATRT) indicates the intermingling. Thus, at the reproduction, by detecting the mixed mode flag FLG and the channel number data CHn, the recorded audio data can be recorded in the corresponding recording mode.

The operation for reproducing data is described hereinafter with reference to FIG. 8.

Figure 8:
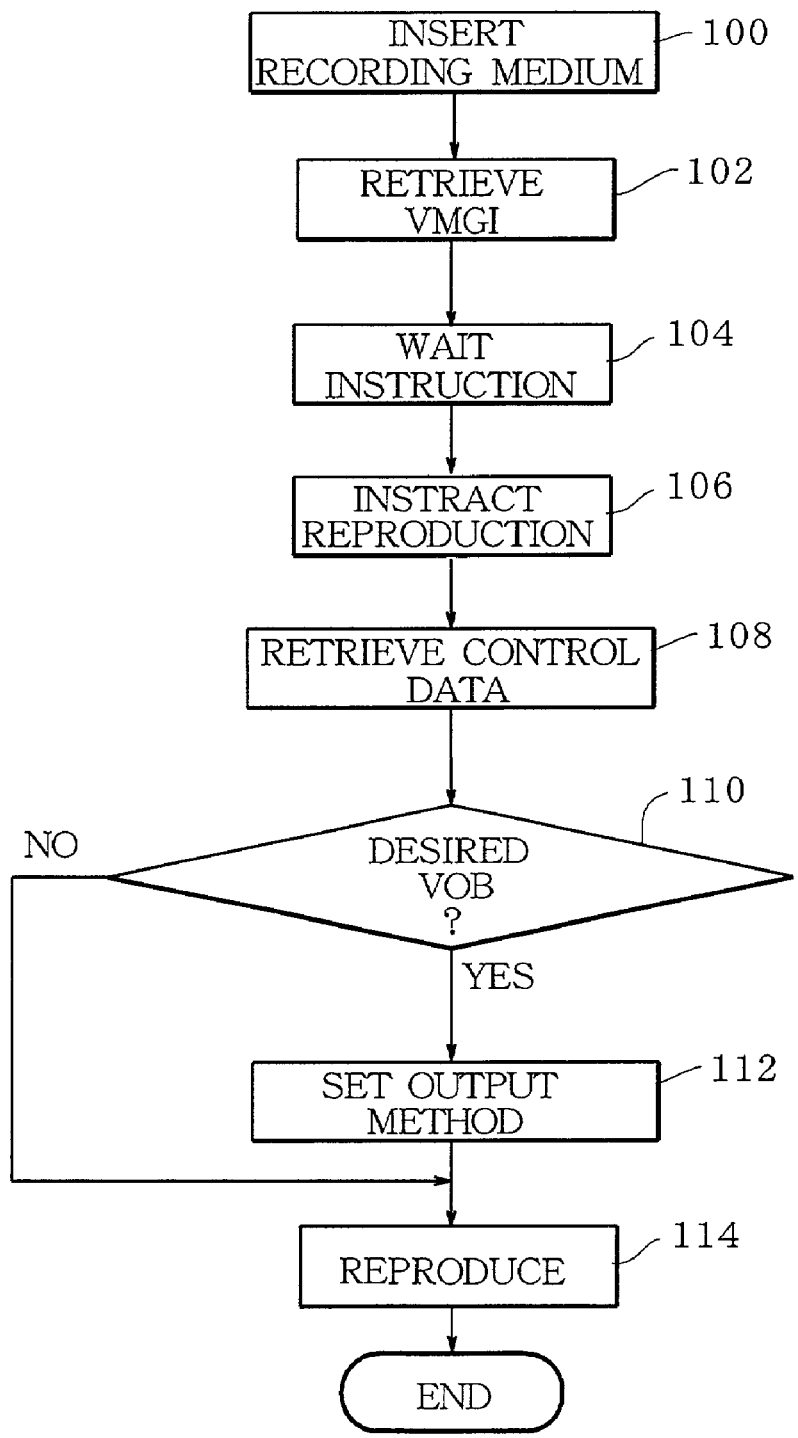
FIG. 8 is a flowchart of operation of the system of the present invention.

Referring to FIG. 8, at a step 100, the user turns on the power of the recording and reproducing system 1, and inserts the DVD-RW 2. At a step 102, the pickup 4 reads the video manager information (VMGI) recorded on the DVD-RW 2 and feeds it to the reproducing system 7. In the reproducing system 7, the video manager information (VMGI) is fed to the reproducing buffer memory 24 through the reproducing circuit 26 and the decoder 25. Thereafter, the system awaits the instruction of the user at a step 104.

At the step 104, the user manually selects the desired video object (VOB), or the automatic reproduction is carried out without any instruction.

When the user makes an instruction as described above, and further instructs the start of reproduction at a step 106, the instruction is applied to the central control circuit 8, thereby proceeding to a step 108.

At the step 108, the central control circuit 8 makes an access to the reproducing buffer memory 24 and retrieves the navigation data Cmr of each of the items stored in the audio stream attribute table (VOB_AST_ATRT) shown in FIG. 4. Moreover, the central control circuit 8 confirms which of the data compressing systems (AC-3, MPEG audio, linear PCM) is used, and further confirms whether the recording mode is the multiplex recording mode, stereophonic recording mode, monaural recording mode or mixed mode based on the mixed mode flag FLG and the channel number CHn.

For example, as shown in FIG. 7*c*, when the channel number CHn is 1+1 channel data or 2/0 channel data, and the mixed mode flag FLG is set to "1", it is determined that the stereophonic recording mode and the multiplex recording mode are mixed. In addition, it is determined that the stereophonic audio data and multiplexed audio data are recorded in one stream.

If the mixed mode flag FLG is set to "0", the recording mode is determined in accordance with the data of the channel number CHn.

At a step 110, it is determined whether a desired video object (VOB) is selected or not. When YES, the program goes to a step 114 where the presentation data is reproduced after executing the process of a step 112. When the answer at the step 110 is NO, the program goes directly to the step 114.

When a digitally input audio-visual device is connected to the recording and reproducing system 1 of the present invention, the user operates the operating section 9 to select the reproducing method appropriate for the device at the step 112. For example, when either of the reproducing systems which are in compliance with the MPEG 2 audio standard and the AC-3 standard is selected, the digital output circuit 22*g* provided in the audio extending circuit 22 is set to the selected digital output mode in accordance with the control signal C7. When the reproducing system is not selected, the digital output circuit 22g is automatically set to the digital output mode for the linear PCM standard.

In a case where the video object (VOB) has a stereophonic audio stream or a multiplex audio stream, the user selects one of the two channels, or one of the right and left channels. The digital output circuit 22g is accordingly set by the control signal C7 to the digital output mode of the desired channel.

Thus, after the output method is determined at the step 112, the presentation data are reproduced at the step 114.

At the step 114, after it is determined that the information is recorded in the mixed mode, the reproduction of two channels is carried out based on the data of the channel number in the audio pack A shown in FIGS. 6a to 6c. The control signal C7 is fed to the multiplexer 23 and the audio extending circuit 22, thereby decoding the audio data of the right and left channels into reproducing audio signals. If the data is the multiplexed audio data, the data are decoded to form the reproducing audio signals of the main sound and sub-sound.

Thus, in accordance with the present invention, the DVD-RW 2 has a logical data structure which enables to record the multiplexed audio signal with the stereophonic audio signal in one stream. On the other hand, the recording and reproducing system 1 reproduces the multiplexed audio signal in the same manner as the stereophonic audio signal in accordance with the data structure. As a result, whereas the noises and the silent period are liable to occur when the multiplexed audio signal is reproduced in accordance with the DVD-Video standard, in the present invention, the multiplexed audio signals and the stereophonic audio signals are consecutively reproduced without causing noises and silence.

Moreover, the mixed mode is detected based on the information indicated by the mixed mode flag FLG and the channel number CHn, and the multiplexed audio signals and the stereophonic audio signals are reproduced based on the number of channels in the audio pack. Thus the signals are reproduced without changing the stream based on the video object (VOB) unit, so that the noises and silence are further prevented.

From the foregoing it will be understood that the present invention provides a recording medium where the multiplexed audio information, the multi-channel audio information, and the monaural audio information are recorded in one stream. Hence, when recording a foreign movie including bilingual speech and stereophonic sound under various recording modes, the information can be recorded and reproduced without changing the stream. As a result, noises and the silent periods are restrained. Moreover, the recording capacity of the medium can be efficiently used.

While the invention has been described in conjunction with preferred specific embodiment thereof, it will be understood that this description is intended to illustrate and not limit the scope of the invention, which is defined by the following claims.

What is claimed is:

1. A disc-shaped recording medium comprising:
a video data recording area in which video data and an audio stream containing audio data are to be recorded; and
a video manager recording area located in a different position from the video data recording area in a direction of a diameter of the recording medium, in which control information is to be recorded,
wherein the control information includes a mixed mode flag indicating whether at least two of multiplexed audio, multi-channel audio and monaural audio are mixed as one stream, and selected in succession.

2. The recording medium according to claim 1, wherein the audio stream contains multiplexed audio data.

3. The recording medium according to claim 2, wherein the multiplexed audio data consists of a plurality of audio channels and contains multiple language data in different audio channels.

4. The recording medium according to claim 1, wherein the control information further includes number information indicating a number of audio channels in the audio stream.

5. The recording medium according to claim 1, wherein the control information further includes number information specifying one of the recording modes.

6. The recording medium according to claim 1, wherein the control information further includes rate information indicating a bit rate of the audio data.

7. The recording medium according to claim 1, wherein the video manager recording area is located inward of the video data recording area.

8. The recording medium according to claim 1, wherein the control information includes application information indicating whether or not the audio stream recorded in the video data recording area contains audio data intermingled from different recording modes in a channel.

9. A system for recording audio data on a disc-shaped recording medium comprising:
a recording device which records video data and audio data in a video data recording area of the recording medium as an audio stream; and
a generating device which generates control information including a mixed mode flag indicating whether at least two of multiplexed audio, multi-channel audio and monaural audio are mixed as one stream, and selected in succession,
wherein the recording device records the control information in a video manager recording area located in a different position from the video data recording area in a direction of a diameter of the recording medium.

10. The system according to claim 9, wherein the audio stream includes multiplexed audio data.

11. The system according to claim 10, wherein the multiplexed audio data consists of a plurality of audio channels and contains multiple language data in different audio channels.

12. The system according to claim 9, wherein the generating device further generates number information indicating a number of audio channels in the audio stream.

13. The system according to claim 9, wherein the generating device further generates number information specifying one of the recording modes.

14. The system according to claim 9, wherein the generating device further generates rate information indicating a bit rate of the audio data.

15. The recording medium according to claim 9, wherein the video manager recording area is located inward of the video data recording area.

16. The system according to claim 9, wherein the generating device generates control information including application information indicating whether or not the audio stream recorded in the video data recording area contains audio data intermingled from different recording modes in a channel.

17. A system for reproducing audio data from a disc-shaped recording medium including a video data recording area in which video data and an audio stream containing the audio data are recorded, and a video manager recording area located in a different position from the video data recording area in a direction of a diameter of the recording medium in which control information is recorded, wherein the control information includes a mixed mode flag indicating whether at least two of multiplexed audio, multi-channel audio and monaural audio are mixed as one stream, and selected in succession, the system comprising:

a reading device which reads the control information from the video manager recording area of the recording medium; and a controller which controls the reproduction of the audio data recorded in the video data recording area of the recording medium based on the control information.

18. The system according to claim 17, wherein the audio stream contains multiplexed audio data.

19. The system according to claim 18, wherein the multiplexed audio data consists of a plurality of audio channels and contains multiple language data in different audio channels, the system further comprising operating device for selecting one of the multiple language data, wherein the controller controls the reproduction of the audio data such that only the selected one of the multiple language data is reproduced.

20. The system according to claim 17, wherein the control information further includes number information indicating a number of audio channels in the audio stream.

21. The system according to claim 17, wherein the control information further includes number information specifying one of the recording modes.

22. The system according to claim 17, wherein the control information further includes rate information indicating a bit rate of the audio data.

23. The recording medium according to claim 17, wherein the video manager recording area is located inward of the video data recording area.

24. The system according to claim 17, wherein the control information includes application information indicating whether or not the audio stream recorded in the video data recording area contains audio data intermingled from different recording modes in a channel.

25. A method of recording audio data on a disc-shaped recording medium comprising the steps of:

recording video data and audio data of one audio stream in a video data recording area of the recording medium;

generating control information including a mixed mode flag indicating whether at least two of multiplexed audio, multi-channel audio and monaural audio are mixed as one stream, and selected in succession; and recording the control information in a video manager recording area located in a different position from the video data recording area in a direction of a diameter of the recording medium.

26. The method according to claim 25, wherein the audio stream contains multiplexed audio data.

27. The method according to claim 26, wherein the multiplexed audio data consists of a plurality of audio channels and contains multiple language data in different audio channels.

28. The method according to claim 25, wherein the control information further includes number information indicating a number of audio channels in the audio stream.

29. The method according to claim 25, wherein the control information further includes number information specifying one of the recording modes.

30. The method according to claim 25, wherein the control information further includes rate information indicating a bit rate of the audio data.

31. The recording medium according to claim 25, wherein the video manager recording area is located inward of the video data recording area.

32. The method according to claim 25, wherein generating control information includes generating control information including application information indicating whether or not the audio stream recorded in the video data recording area contains audio data intermingled from different recording modes in a channel.

33. A method of reproducing audio data from a disc-shaped recording medium including a video data recording area in which video data and an audio stream containing the audio data are recorded, and a video manager recording area located in a different position from the video data recording area in a direction of a diameter of the recording medium, in which control information is recorded, wherein the control information includes a mixed mode flag indicating whether at least two of multiplexed audio, multi-channel audio and monaural audio are mixed as one stream, and selected in succession, the method comprising the steps of:

reading the control information from the video manager recording area of the recording medium; and controlling the reproduction of the audio data recorded in the video data recording area of the recording medium based on the control information.

34. The method according to claim 33, wherein the audio stream contains multiplexed audio data.

35. The method according to claim 34, wherein the multiplexed audio data consists of a plurality of audio channels and contains multiple language data in different audio channels, the method further comprising the step of selecting one of the multiple language data, wherein the step of controlling the reproduction controls the reproduction of the audio data such that only the selected one of the multiple language data is reproduced.

36. The method according to claim 34, wherein the control information further includes number information indicating a number of audio channels in the audio stream.

37. The method according to claim 33, wherein the control information further includes number information specifying one of the recording modes.

38. The method according to claim 33, wherein the control information further includes rate information indicating a bit rate of the audio data.

39. The recording medium according to claim 33, wherein the video manager recording area is located inward of the video data recording area.

40. The method according to claim 33, wherein the control information includes application information indicating whether or not the audio stream recorded in the video data recording area contains audio data intermingled from different recording modes in a channel.

41. A disc-shaped recording medium comprising:

a video data recording area in which an audio stream containing audio data is recorded; and a video manager recording area located in a different position from the video data recording area in a direction of a diameter of the recording medium in which control information is recorded, wherein the control information includes a mixed mode flag indicating whether multiplexed audio, multi-channel audio and monaural audio are mixed as one stream.

42. The recording medium of claim 41, wherein the control information also includes channel number data.

43. The recording medium of claim 42, wherein the channel number data indicates multiplexed audio data, multi-channel audio data, and monaural audio data.

44. The recording medium according to claim 41, wherein the video manager recording area is located inward of the video data recording area.

45. A system for recording audio data on a disc-shaped recording medium comprising:

a recording device which records audio data in a video data recording area of the recording medium as an audio stream; and a generating device which generates control information including a mixed mode flag indicating whether multiplexed audio, multi-channel audio and monaural audio are mixed as one stream, wherein the recording device records the control information in a video manager recording area located in a different position from the video data recording area in a direction of a diameter of the recording medium.

46. The system of claim 45, wherein the control information also includes channel number data.

47. The system of claim 46, wherein the channel number data indicates multiplexed audio data, multi-channel audio data, and monaural audio data.

48. The recording medium according to claim 45, wherein the video manager recording area is located inward of the video data recording area.

49. A system for reproducing audio data from a disc-shaped recording medium including a video data recording area in which an audio stream containing the audio data is recorded, and a video manager recording area located in a different position from the video data recording area in a direction of a diameter of the recording medium in which control information is recorded, wherein the control information includes a mixed mode flag indicating whether multiplexed audio, multi-channel audio and monaural audio are mixed as one stream, the system comprising:

a reading device which reads the mixed mode flag from the video manager recording area of the recording medium; and a controller which controls the reproduction of the audio data recorded in the video data recording area of the recording medium based on the mixed mode flag.

50. The system of claim 49, wherein the control information also includes channel number data.

51. The system of claim 50, wherein the channel number data indicates multiplexed audio data, multi-channel audio data, and monaural audio data.

52. The recording medium according to claim 49, wherein the video manager recording area is located inward of the video data recording area.

53. A method of recording audio data on a disc-shaped recording medium comprising the steps of:

recording audio data in a video data recording area of the recording medium as an audio stream;

generating control information including a mixed mode flag indicating whether multiplexed audio, multi-channel audio and monaural audio are mixed as one stream; and recording the control information in a video manager recording area located in a different position from the video data recording area in a direction of a diameter of the recording medium.

54. The method of claim 53, wherein the control information also includes channel number data.

55. The method of claim 54, wherein the channel number data indicates multiplexed audio data, multi-channel audio data, and monaural audio data.

56. The recording medium according to claim 53, wherein the video manager recording area is located inward of the video data recording area.

57. A method of reproducing audio data from a disc-shaped recording medium comprising a video data recording area in which an audio stream containing the audio data is recorded, and a video manager recording area located in a different position from the video data recording area in a direction of a diameter of the recording medium, in which control information is recorded, wherein the control information includes a mixed mode flag indicating whether multiplexed audio, multi-channel audio and monaural audio are mixed as one stream, the method comprising the steps of:

reading the mixed mode flag from the video manager recording area of the recording medium; and controlling the reproduction of the audio data recorded in the video data recording area of the recording medium based on the mixed mode flag.

58. The method of claim 57, wherein the control information also includes channel number data.

59. The method of claim 58, wherein the channel number data indicates multiplexed audio data, multi-channel audio data, and monaural audio data.

60. The recording medium according to claim 57, wherein the video manager recording area is located inward of the video data recording area.

* * * * *